US007722248B1

(12) United States Patent
Chapman et al.

(10) Patent No.: US 7,722,248 B1
(45) Date of Patent: *May 25, 2010

(54) WIRELESS REMOTE COOKING THERMOMETER SYSTEM

(75) Inventors: Peter A. Chapman, Avon By The Sea, NJ (US); Chee-Ann Chang, Kwun Tong (HK)

(73) Assignee: Maverick Industries, Inc., Edison, NJ (US)

( * ) Notice: Subject to any disclaimer, the term of this patent is extended or adjusted under 35 U.S.C. 154(b) by 457 days.

This patent is subject to a terminal disclaimer.

(21) Appl. No.: 10/733,129

(22) Filed: Dec. 11, 2003

Related U.S. Application Data (63) Continuation of application No. 10/464,082, filed on Jun. 17, 2003, now Pat. No. 6,811,308, which is a continuation of application No. 10/354,565, filed on Jan. 30, 2003, now Pat. No. 6,712,505, which is a continuation of application No. 09/658,758, filed on Sep. 8, 2000, now Pat. No. 6,568,848.

(60) Provisional application No. 60/155,369, filed on Sep. 20, 1999.

(51) Int. Cl.
*G01K 1/02* (2006.01)
(52) U.S. Cl. ............... 374/155; 374/141; 374/208; 340/870.17; 99/342
(58) Field of Classification Search ............ 374/155, 374/141, 179, 149, 150, 208, 163, 183; 340/870.17, 340/870.04, 870.09, 870.01, 501, 588, 589, 340/584–585; 99/342–344
See application file for complete search history.

(56) References Cited

U.S. PATENT DOCUMENTS 3,582,921 A * 6/1971 Krieger ............... 340/870.09
3,849,622 A   11/1974 Merriam
3,851,191 A * 11/1974 Deebel et al. ......... 340/870.17

(Continued)

FOREIGN PATENT DOCUMENTS

DE           3437398 A      4/1986

(Continued)

OTHER PUBLICATIONS

OMEGA Engineering, Inc. Temperature Book, 1989.

(Continued)

*Primary Examiner*—Gail Verbitsky
(74) *Attorney, Agent, or Firm*—Lerner, David, Littenberg, Krumholz & Mentlik, LLP (57) ABSTRACT

A wireless remote cooking thermometer system includes a first unit positionable at a first location adjacent food being cooked, the first unit including a radio frequency transmitter adapted to transmit temperature readings for the food being cooked, and a temperature sensor connectable to the first unit for providing temperature readings to the first unit. The system also includes a second unit including a radio frequency receiver adapted to receive the temperature readings transmitted by the radio frequency transmitter and a visual display for displaying the received temperature readings, wherein the second unit is movable to a second location remote from the first location while maintaining radio contact with the first unit. The system includes a microprocessor operative to calibrate a taste preference and a choice preference associated with the food being cooked.

18 Claims, 5 Drawing Sheets

U.S. PATENT DOCUMENTS

| | | | | | |
|---|---|---|---|---|---|
| 4,089,222 | A | | 5/1978 | Perkins | |
| 4,131,786 | A | * | 12/1978 | Cooper | 219/487 |
| 4,377,733 | A | | 3/1983 | Yamaguchi et al. | |
| 4,475,024 | A | | 10/1984 | Tateda | |
| 4,509,868 | A | | 4/1985 | Ronconi et al. | |
| 4,626,662 | A | | 12/1986 | Woolf | |
| 4,716,411 | A | | 12/1987 | Nakamura | |
| 4,812,963 | A | * | 3/1989 | Albrecht et al. | 700/2 |
| 4,966,125 | A | | 10/1990 | Stephen et al. | |
| 4,967,049 | A | | 10/1990 | Kaneshiro et al. | |
| 5,365,043 | A | | 11/1994 | Bradford | |
| 5,378,874 | A | * | 1/1995 | Holling et al. | 219/506 |
| 5,398,597 | A | | 3/1995 | Jones et al. | |
| 5,622,137 | A | | 4/1997 | Lupton, Jr. et al. | |
| 5,634,719 | A | | 6/1997 | LaNeve | |
| 5,710,409 | A | | 1/1998 | Schwarzbacker et al. | |
| 5,711,606 | A | * | 1/1998 | Koether | 374/149 |
| 5,727,290 | A | | 3/1998 | Gilbert et al. | |
| 5,746,114 | A | | 5/1998 | Harris | |
| 5,780,822 | A | | 7/1998 | Lee | |
| 5,837,944 | A | | 11/1998 | Herot | |
| D402,212 | S | | 12/1998 | Sirois et al. | |
| D402,213 | S | | 12/1998 | Sirois et al. | |
| 5,844,862 | A | | 12/1998 | Cocatre-Zilgien | |
| 5,867,131 | A | | 2/1999 | Camp, Jr. et al. | |
| 5,911,507 | A | | 6/1999 | Jaynes | |
| 5,939,974 | A | * | 8/1999 | Heagle et al. | 340/286.09 |
| 5,983,783 | A | | 11/1999 | Archard et al. | |
| D418,069 | S | | 12/1999 | Chung et al. | |
| 6,000,845 | A | | 12/1999 | Tymkewicz et al. | |
| 6,043,461 | A | | 3/2000 | Holting et al. | |
| 6,046,674 | A | | 4/2000 | Irwin et al. | |
| 6,080,972 | A | | 6/2000 | May | |
| 6,100,509 | A | * | 8/2000 | Saito | 219/494 |
| 6,121,596 | A | | 9/2000 | Taino et al. | |
| 6,142,666 | A | | 11/2000 | Koether et al. | |
| 6,238,354 | B1 | | 5/2001 | Alvarez | |
| 6,300,871 | B1 | | 10/2001 | Irwin et al. | |
| 6,351,217 | B1 | | 2/2002 | Kuhn | |
| 6,363,328 | B1 | * | 3/2002 | Nadeau | 702/27 |
| 6,384,810 | B1 | | 5/2002 | Selker | |
| 6,568,848 | B1 | | 5/2003 | Chapman et al. | |
| 6,646,567 | B1 | | 11/2003 | Olivas | |
| 6,817,757 | B1 | * | 11/2004 | Wallace | 374/120 |
| 7,372,368 | B2 | * | 5/2008 | Chapman et al. | 340/584 |
| 2001/0002552 | A1 | | 6/2001 | Vinci | |
| 2002/0024512 | A1 | | 2/2002 | Terasawa et al. | |
| 2003/0202558 | A1 | | 10/2003 | Chung et al. | |

FOREIGN PATENT DOCUMENTS

| | | |
|---|---|---|
| JP | 0147025 | 11/1981 |
| JP | 62062130 A | 3/1987 |

OTHER PUBLICATIONS

New York Times, Nov. 22, 2001 Article: A Thermometer That Squawks When the Bird is Done.
Polder Home Tools.
USDA, Food Safety and Inspection Service Brochure, "Use a Food Thermometer," slightly revised May 2003.
2002 Kitchenware News & Housewares Review—Jan./Feb. 2002—p. 30.
Complaint and Demand for Jury Trial, *Maverick Industries, Inc.* v. *Polder, Inc.*, Case No. 03-2509 (DMC), U.S. District Court, District of New Jersey.
Complaint and Demand for Jury Trial, *Maverick Industries, Inc.* v. *Taylor Precision Products, LLC and Trueserv Corporation*, Civil Action No. 03-5802 (KSH), U.S. District Court, District of New Jersey.
Answer, Affirmative Defenses, Counterclaims and Demand for Jury Trial of Defendant Taylor Precision Products, *LLC and Trueserv Corporation, Maverick Industries, Inc.* v. *Taylor Precision Products, LLC and Trueserv Corporation*, Civil Action No. 03-5802 (KSH), U.S. District Court, District of New Jersey.
Plaintiff Maverick Industries, Inc.'s Reply to Defendants' Counterclaims, *Maverick Industries, Inc.* v. *Taylor Precision Products, LLC and Trueserv Corporation*, Civil Action No. 03-CV-5802 (KSH), U.S. District Court, District of New Jersey.
Order of Dismissal, *Maverick Industries* v. *Taylor Precision, et al.*, Civil No. 03-5802 (KSH), U.S. District Court, District of New Jersey.
Complaint and Demand for Trial by Jury, *Maverick Industries, Inc* v. *Taylor Precision Produsts, LLC*, Civil Action No. 05-3841 (WJM), U.S. District Court, District of New Jersey.
Answer, Affirmative Defenses, Counterclaims, Demand for Jury Trial, Statements Pursuant to Local Civil Rule 11.2 and F.R.C.P. 7.1(a), and Certification of Service of Defendant Taylor Precision Products, LLC, *Maverick Industries, Inc.* v. *Taylor Precision Products, LLC*, Civil Action No. 05-3841-WJM-RJH, U.S. District Court, District of New Jersey.
Plaintiff Maverick Industries, Inc.'s Reply to Defendant's Counterclaims, *Maverick Industries, Inc.* v. *Taylor Precision Products, LLC*, Civil Action No. 05-3841 (WJM), U.S. District Court, District of New Jersey.
Order of Dismissal, *Maverick Industries, Inc.* v. *Taylor Precision Products, LLC*, Civil Action No. 05-3841 (WJM), U.S. District Court, District of New Jersey.
Stipulation and Order, *Maverick Industries* v. *Polder, Inc.*, U.S. District Court, District of New Jersey.
Complaint, *Polder, Inc.* v. *Maverick Industries, Inc.*, U.S. District Court, Southern District of New York.
Maverick Industries, Inc.'s Answer and Affirmative Defenses, *Polder, Inc.* v. *Maverick Industries, Inc.*, U.S. District Court, Southern District of New York.
Maverick Industries, Inc.'s Responses to Plaintiffs First Interrogatories to Defendant, *Polder Inc.* v. *Maverick Industries Inc.*, U.S. District Court, Southern District of New York.
Maverick Industries, Inc.'s Response to Plaintiff's First Request for Production of Documents, *Polder, Inc.* v. *Maverick Industries, Inc.*, U.S. District Court, Southern District of New York.
Plaintiff Polder, Inc.'s Objections and Responses to Defendant Maverick Industries, Inc.'s First Document Requests to Plaintiff, *Polder, Inc. v. Maverick Industries , Inc.*, U.S. District Court, Southern District of New York.
Plaintiff Polder, Inc.'s Objections and Responses to Defendant Maverick, Industries, Inc.'s First Set of Interrogatories to Plaintiff, *Polder, Inc. v. Maverick Industries, Inc.*, U.S. District Court, Southern District of New York.
Stipulation and Order of Dismissal, *Polder, Inc. v. Maverick Industries, Inc.*, U.S. District Court, Southern District of New York.

* cited by examiner

WIRELESS REMOTE COOKING THERMOMETER SYSTEM

CROSS REFERENCE TO RELATED APPLICATIONS

The present application is a continuation U.S. application Ser. No. 10/464,082 filed on Jun. 17, 2003, now U.S. Pat. No. 6,811,308 which is a continuation of U.S. application Ser. No. 10/354,565 filed on Jan. 30, 2003, now U.S. Pat. No. 6,712,505 which is a continuation of U.S. application Ser. No. 09/658,758 filed on Sep. 8, 2000, now U.S. Pat. No. 6,568,848, which claims the benefit of U.S. Provisional Application 60/155,369 filed on Sep. 20, 1999, the disclosures all of which are incorporated by reference herein in their entirety.

BACKGROUND OF THE INVENTION

The present invention generally relates to food preparation and more specifically relates to thermometers used to ensure that food, such as meat, is adequately cooked.

The accurate and reliable measurement of temperatures is particularly important in the food preparation industry. Cooking to exact temperature ranges is critical in gourmet cooking and to avoid undercooking food items. As a result, a number of devices have been developed to accurately measure the temperature of food items being cooked.

U.S. Pat. No. 6,000,845 to Tymkewicz et al. discloses a temperature sensing and indicating device including a housing and an arm that is retractable and extendable into and out of the housing so that the length of the arm can be varied in a predetermined manner. A probe having a temperature sensor therein is enclosed by the arm so that varying the external length of the arm exposes varying lengths of the probe, whereby the exposed length of the probe is inserted into a medium so that the temperature sensor senses the temperature of the medium and converts the temperature sensed into a signal. Using a microprocessor, the signal is conditioned and converted for controlling a visual display that provides a visual indication of the temperature sensed. The visual indication includes a digital numeric display and an analog display.

U.S. Pat. No. 4,089,322 discloses a temperature telemetering device that is typically used with household cooking ranges, ovens, microwave ovens and the like. The device includes a probe having an internal cavity that receives a temperature expansive material such as wax. The cavity is in communication with a displaceable member such as a piston that is responsive to the pressure of the temperature expansive material and is mechanically linked to a latch mechanism that inhibits the operation of a sonic or ultra-sonic signal generator. The assembly is interconnected by adjustment means permitting a variable space between the latch mechanism and the displaceable member, whereby the trigger temperature mechanism can be adjusted.

U.S. Pat. No. 5,983,783 to Archer, discloses an electronic chef's fork which displays indicia such as food type and degree of doneness for a selected food type and temperature, and which includes control areas by which a user selects a meat type. The electronic chef's fork includes operational circuitry that enables a user to select among an array of food type options and to designate a degree of doneness for the selected food types. A prompt message is provided to indicate the degree of doneness attained for the selected food type when the device is inserted into food.

U.S. Pat. No. 4,966,125 discloses a barbecue kettle including a bowl and a cover with the bowl having a food support grid adjacent and an upper rim and a charcoal grid below the food grid along with a cover holder adjacent the rim of the bowl. The cover has a removable thermometer that can sense the internal temperature of the kettle and can also be used as a food thermometer.

U.S. Pat. No. 5,634,719 discloses a food-handling device which a retractable boom mounted temperature probe. The tool has a probe mounted on a manually retractable boom, the probe being extendable over various sites of the food being checked. The boom is pivotally attached to the elongated arm of a spatula and, by a scissor-like action, is raised out of and lowered into the food. The tool is provided with a temperature indicator in the form of a digital readout.

In spite of the above advances, there remains a need for a temperature monitoring system that enables an operator to move away from a cooking location, while maintaining continuous temperature monitoring contact with the cooking location. There is also a need for a temperature monitoring system which is mobile so that the system can be used at a plurality of cooking sites.

SUMMARY OF THE INVENTION

The present invention is a programmable thermometer timer system that ensures that various types of meat such as beef, veal, lamb, pork, chicken, and turkey are adequately cooked in accordance with guidelines established by the U.S.D.A. The system includes a programmable thermometer timer unit having a visual display and keys for entering information into a program stored in the timer structure. The programmable thermometer timer preferably incorporates electronic technology and may have one or more microprocessors for operating one or more temperature control programs.

The system also includes a remote monitoring unit having one or more temperature probes connected thereto. The temperature probes may be inserted into meat being cooked for measuring the internal temperature of the meat. The remote monitoring unit preferably includes a transmission device capable of transmitting temperature readings from the remote unit to the programmable thermometer timer unit. The transmission of the temperature readings from the remote monitoring unit to the timer unit may be made by radio signals, a communication cable, or other methods of transmitting signals from a monitor to a base unit, well known to those skilled in the art.

In operation, a user may select a type of meat to be cooked and a taste preference directed to how well-done the meat should be cooked (i.e. rare, medium rare, medium, well-done, etc.). The user will then enter this information into the programmable thermometer timer unit using entry keys. The particular selection made by the user will be displayed on the display screen of the timer unit. The display screen may be a light-emitting diode display or a liquid crystal display. The display screen may also incorporate other technologies that are able to show the user information entered into the timer unit. The user will then place the remote monitoring unit in the vicinity of the meat being cooked. The user will then insert the one or more temperature measuring probes into the meat. As mentioned above, the remote monitoring unit will continuously measure the internal temperature of the meat and transmit this data to the timer unit, such as by using radio frequency signals or a communications cable connecting the remote unit to the programmable timer unit. The user will then press a start button on the programmable thermometer timer unit to start the monitoring operation. During cooking of the meat, the display screen of the timer unit may continuously display cooking information, such as the type of meat being cooked, the taste preference (i.e., well-done), the temperature of the meat and the time remaining until the meat is fully cooked, in accordance with the user's selected taste preferences. The programmable thermometer timer unit may include a clip or fastener so that the unit may be carried on the body of the operator. This feature allows a user to continuously monitor the progress of the cooking operation while engaging in other activities. The timer unit may also include one or more supporting elements for enabling the timer unit to be placed on a support structure, such as a table, and stand in an upright position. The timer unit may also include a noise generating element, such as a beeper, that provides audio signals to a user during critical times of the cooking operation. The timer unit may also include a visual alarm, such as a light-emitting diode.

DETAILED DESCRIPTION OF THE PREFERRED EMBODIMENT

Figure 1:
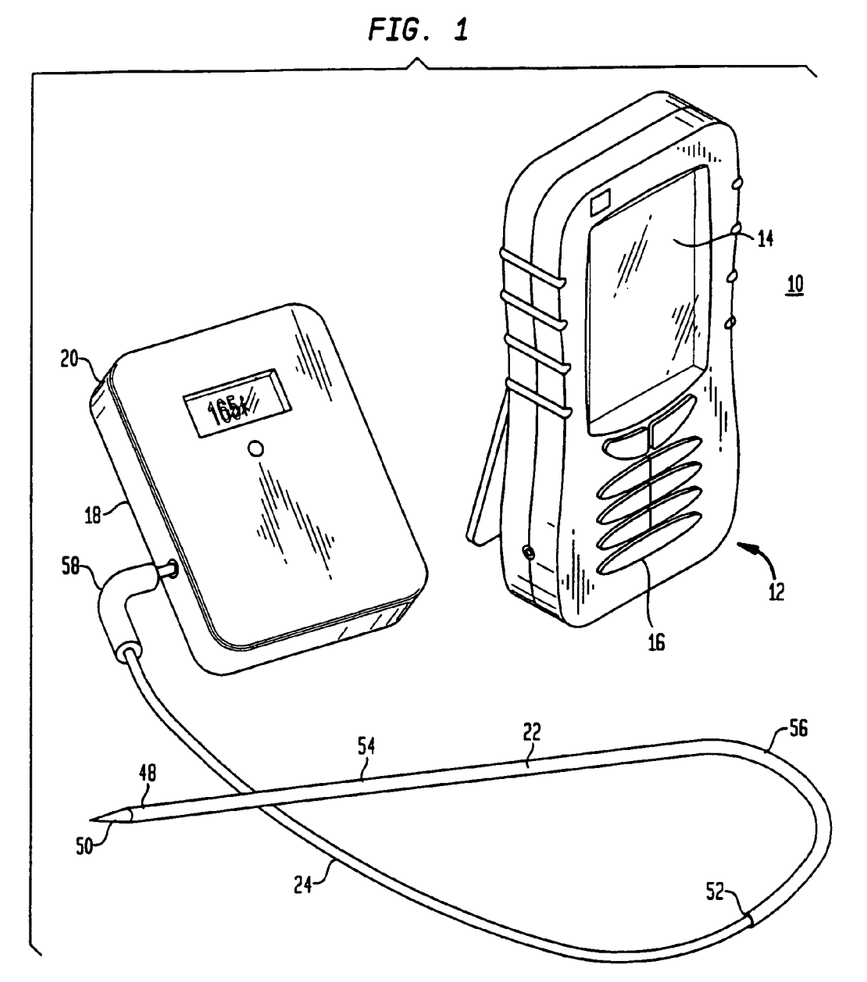
FIG. 1 shows a perspective view of a programmable thermometer timer system in accordance with one preferred embodiment of the present invention.

FIG. 1 shows a perspective view of a programmable thermometer timer system 10, in accordance with certain preferred embodiments of the present invention. The system 10 includes a first unit 18 and a second unit or programmable thermometer timer unit 12, having display screen 14, and data entry keys 16. The second unit 12 includes one or more microprocessors for operating temperature control programs for cooking meat to preferred temperatures. The data entry keys 16 are used by an operator to enter cooking-related information into the timer unit, such as the type of meat being cooked and taste preferences (i.e., well-done).

The system 10 also includes the first unit 18, a remote monitoring and transmitting unit that is capable of monitoring the temperature of the meat being cooked and transmitting the temperature to the second unit 12. The first unit 18 includes a display screen for showing information related to the cooking operation, such as the temperature of the meat. A temperature probe 22 is connected to the remote monitoring first unit. The temperature probe is preferably inserted into the meat being cooked for continuously measuring the internal temperature of the meat. The measured temperature is then carried through communication line 24 to the remote monitoring unit. The first unit may include two or more temperature probes for monitoring the temperatures of various pieces of meat. For example, the first probe may measure the temperature of a piece of chicken and the second probe may monitor the temperature of a steak. The temperatures monitored by the remote or first unit 18 are continuously transmitted to the timer or second unit 12. The temperature data may be transmitting using radio frequency waves or by a direct communications link between the remote or first unit and the timer or second unit 12. In other preferred embodiments, the temperature probes 22 may be directly connected to the timer or second unit 12, thereby obviating the need for the remote or first unit 18.

Figure 2:
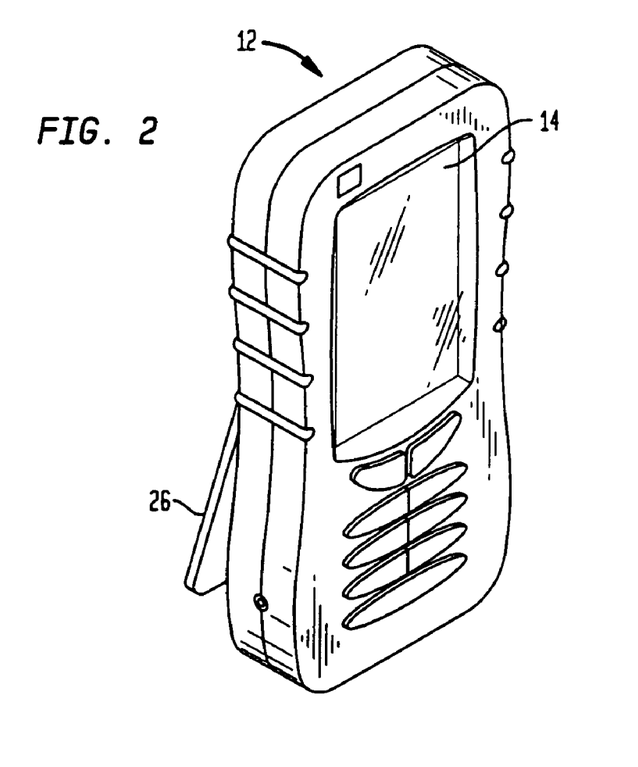
FIG. 2 shows a perspective view of a programmable thermometer timer unit of the system shown in FIG. 1.

FIG. 2 shows a perspective view of the timer or second unit 12, including a supporting device 26 for supporting the timer unit in an upright orientation over a supporting structure, such as a table. The timer or second unit 12 may be powered using electrical power such as direct current, alternating current, or batteries. In highly preferred embodiments, the timer unit is powered using batteries inserted into the unit.

Figure 3:
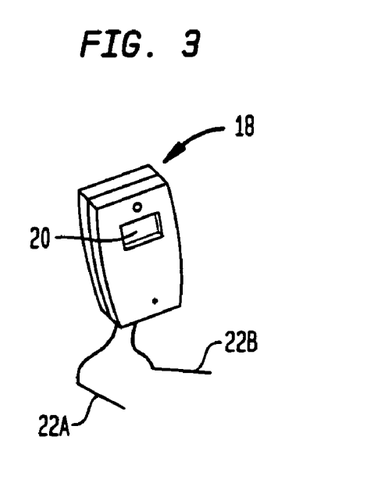
FIG. 3 shows a perspective view of a remote monitoring and transmitting unit shown in FIG. 1.

Referring to FIG. 3, the remote monitoring unit 18 may have a first probe 22A and a second probe 22B connected thereto for monitoring the temperatures of two or more pieces of meat being cooked. The remote monitoring unit 18 also includes a display screen 20.

Figure 4:
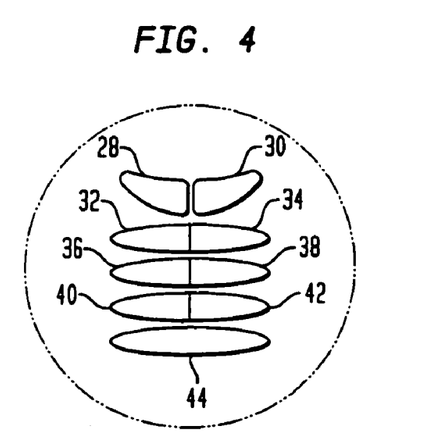
FIG. 4 shows a fragmentary front view of the timer unit shown in FIG. 2, including data entry keys for entering cooking data into the timer unit.

FIG. 4 shows the data entry keys for entering cooking information into the timer or second unit. Key 28 enables the user to display either a clock reading or a timer reading on the display screen 14. Key 30 enables the user to select activation of either temperature probe 22A or temperature probe 22B (FIG. 3). Key 32 enables a user to select the type of meat being cooked, such as beef, veal, or lamb. Key 34 enables a user to select the taste level for cooking the meat (i.e., rare, medium). Keys 36 and 38 enable the user to control the actual temperature to which the meat should be cooked and to change the preferred final cooking temperature of the meat. Key 40 enables the user to set the time in hours on the display screen and Key 40 enables the user to set minutes on the display screen. Finally, Key 44 enables the user to start or stop the timer function of the timer unit.

Figure 5A:
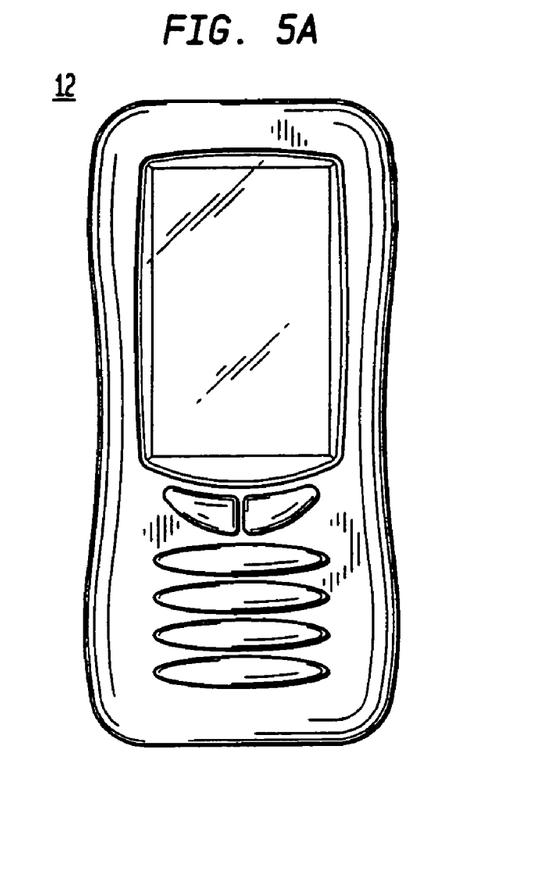
FIGS. 5A, 5B, and 5C show respective front, top, and side views of the programmable thermometer timer unit shown in FIG. 1, in accordance with certain preferred embodiments of the present invention.
Figure 5B:
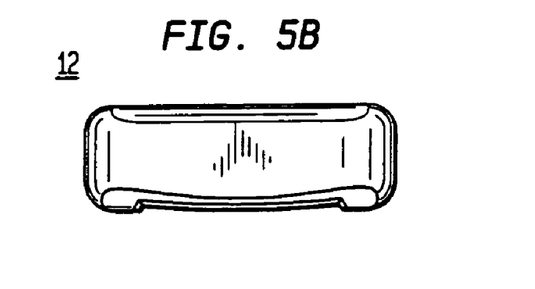
Figure 5C:
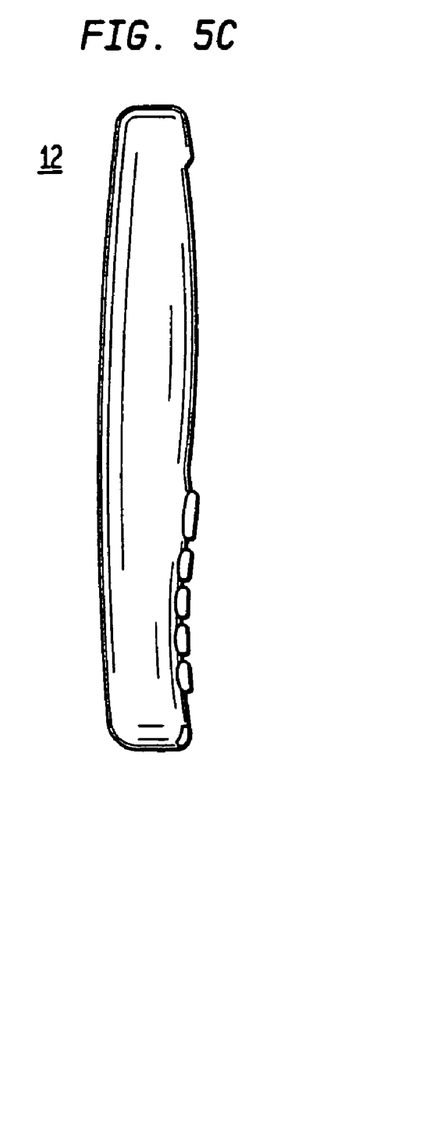

FIGS. 5A-5C show the timer or second unit 12 of FIG. 2. FIG. 5A shows a front view of the timer unit. FIG. 5B shows a top view of the timer unit and FIG. 5C shows a side view of the timer unit 12.

Figure 6A:
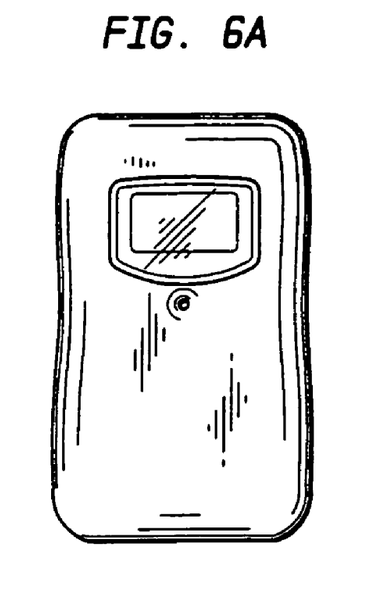
FIGS. 6A, 6B, and 6C show respective front, top, and side views of the remote monitoring and transmitting unit shown in FIG. 1, in accordance with certain preferred embodiments of the present invention.
Figure 6B:
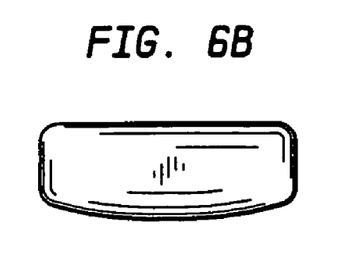
Figure 6C:
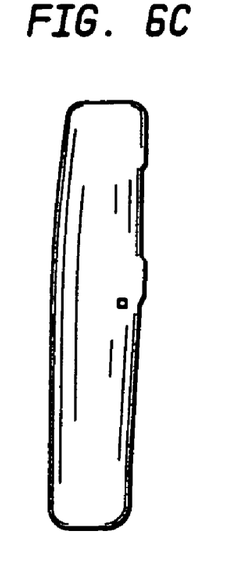

FIGS. 6A-6C show the remote monitoring unit or first unit 18 shown in FIG. 3. FIG. 6A shows a front view of the remote monitoring unit 18. FIG. 6B shows a top view of the remote monitoring unit and FIG. 6C shows a side view of the remote monitoring unit.

Referring back to FIG. 1, temperature probe 22 is made of a substantially rigid material such as stainless steel. Temperature probe 22 includes a distal end including a pointed end 50 and a proximal end 52 connected to communication line 24. Communication line 24 is substantially flexible so that temperature probe 22 may be positioned at various orientations relative to first remote unit 18. Substantially rigid temperature probe 22 includes a substantially straight section extending from distal end 48 and a curved section 56 extending between the straight section 54 and proximal end 52 of probe 22. Flexible communication line 24 includes a first end attached to the proximal end 52 of temperature probe 22. Communication line 24 also includes a plug 58 having a male end 60 insertable into a communication jack 62, preferably accessible at an exterior surface of first unit 18. In operation, plug 58 is inserted into jack 62 of first unit 18 so that temperature readings may be transmitted between substantially rigid probe 22 and first unit 18. Preferably, the pointed end 50 at distal end 48 of substantially rigid probe 22 is inserted into a food item such as meat, for temperature monitoring. The substantially straight section 54 of rigid probe 22 may be oriented at a plurality of orientation relative to first unit 18 due to the flexibility of communication line 24.

Figure 7:
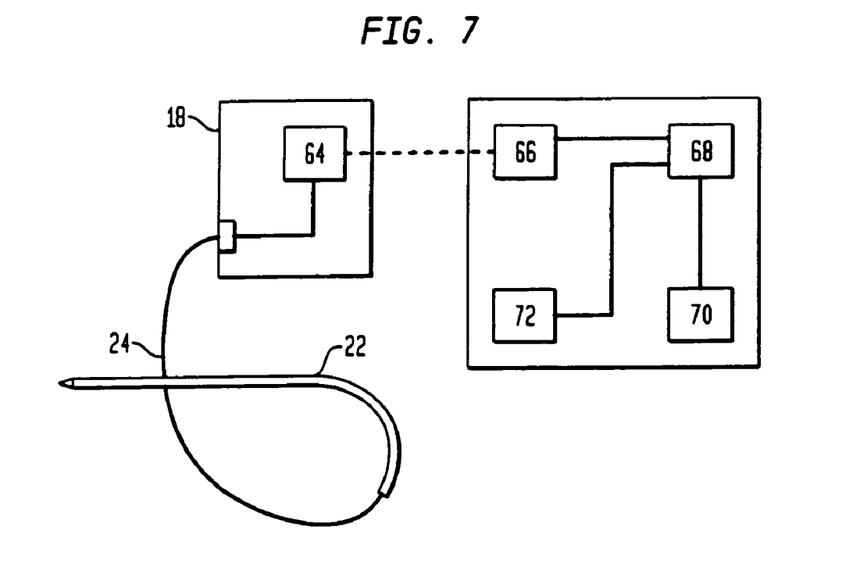
FIG. 7 shows a schematic diagram of the wireless remote cooking thermometer system of the present invention, in accordance with certain preferred embodiments of the present invention.

FIG. 7 shows a schematic view of the wireless remote cooking thermometer system of the present invention. First unit 18 includes a radio transmitter 64 for transmitting temperature reading obtained by substantially ridge probe 22. The temperature reading obtained by probe 22 is passed through substantially flexible communication line 24 and onto radio transmitter 64. The temperature signals are then transmitted to second unit 12. Second unit 12 includes a radio receiver 66 that is adapted to receive the temperature readings transmitted by radio transmitter 64. Second unit 12 also includes a microprocessor 68 capable of calibration for taste preferences, a timer unit 70 for timing a cooking operation, and a noise-generating unit 72 for generating audible signals.

Figure 8:
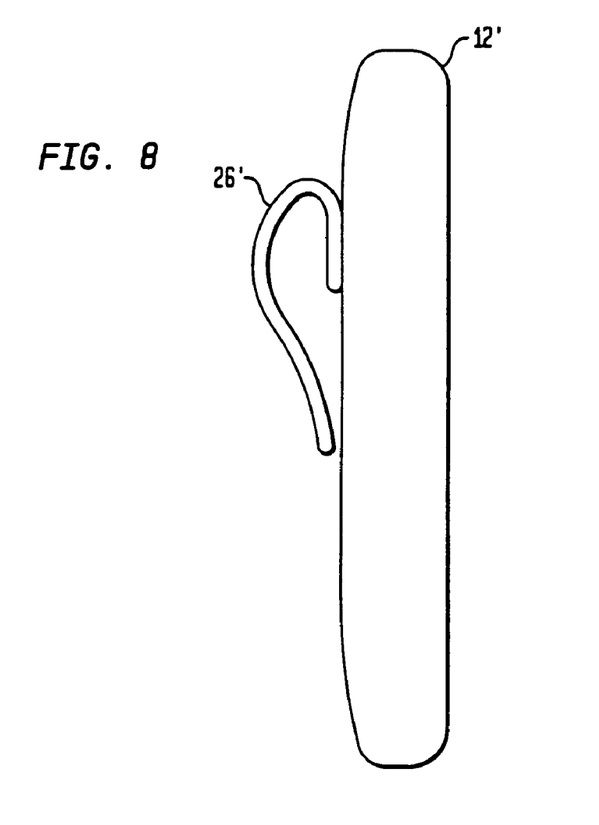
FIG. 8 shows a side view of a programmable thermometer timer unit or second unit including a clip for carrying the unit on the body of an operator, in accordance with certain preferred embodiments of the present invention.

FIG. 8 shows a side view of second unit 12' including a clip 26' for securing the unit 12' to the body of a user during operation of the system. In certain preferred embodiments, the clip may be hooked around a belt worn by a user. In other embodiments, the clip may be hooked to a user's clothes such as a pocket of a shirt or a pants pocket. The clip desirably enables a user to securely carry the second unit on the body while keeping the hands free for other activities.

While there has been described and illustrated embodiments of a wireless remote cooking thermometer system, including a timer unit and a remote monitoring unit, it will be apparent to those skilled in the art that variations and modifications are possible without deviating from the broad spirit and principle of the present invention.

The invention claimed is:

1. A wireless remote cooking thermometer system, comprising:
   a first hand-held unit positionable at a first location adjacent food being cooked, said first hand-held unit including a radio frequency transmitter operative to transmit internal temperature readings associated with the food being cooked;
   said system including at least one microprocessor operative to calibrate a taste preference and a choice preference associated with the food being cooked;
   a temperature sensor for measuring the internal temperature of the food being cooked having a probe and being connectable to said first hand-held unit; and
   a second hand-held unit including a liquid crystal display (LCD) and a radio frequency receiver for reception of the internal temperature readings transmitted by said frequency transmitter of said first hand-held unit.

2. The system as claimed in claim 1, wherein said temperature sensor further comprises a substantially rigid temperature probe having a distal end and a proximal end, said substantially rigid temperature probe including a substantially straight section adjacent the distal end of said probe and a curved section between the substantially straight section and the proximal section of said probe, wherein said proximal end of said probe is attached to a flexible communication line.

3. The system as claimed in claim 1, wherein said first hand-held unit includes a liquid crystal display for selectively displaying said taste preference.

4. The system as claimed in claim 1, wherein said taste preference include rare, medium rare, medium and well done.

5. The system as claimed in claim 1, further comprising a noise-generating unit for providing an audible signal.

6. The system as claimed in claim 5, wherein said noise-generating unit is provided on said second unit.

7. The system as claimed in claim 1, wherein said second unit further includes a timer for timing a cooking operation.

8. The system as claimed in claim 1, wherein said temperature readings are selectively displayed on said liquid crystal display of said second unit in Fahrenheit or Celsius.

9. The system as claimed in claim 1, wherein said liquid crystal display of said second unit is adapted to display cooking information including a type of meat being cooked, a selected taste preference for the meat being cooked, and a measured temperature of the meat being cooked.

10. The system as claimed in claim 1, wherein said liquid crystal display of said second unit is adapted to display time remaining in a cooking operation.

11. The system as claimed in claim 10, wherein said second unit includes a depressible start/stop key for starting and stopping the timer.

12. The system as claimed in claim 2, wherein said flexible communication line of said temperature sensor includes a plug and said first unit includes a communication jack adapted to receive said plug for connecting said temperature sensor with said first unit.

13. A wireless programmable thermometer timer system, comprising:
   a first hand-held unit having a radio frequency transmitter, one or more data entry keys associated with a meat selection preference, a taste selection preference, and a first visual display for displaying a temperature reading, the meat selection preference and the taste preference;
   a temperature sensor having a substantially rigid temperature probe insertable in a meat being cooked and connectable to said first hand-held unit;
   a micro-processor operable to establish a temperature setting based on the meat selection preference and the taste selection preference, monitor the temperature sensor reading and communicate the temperature sensor reading to the radio frequency transmitter; and
   a second hand-held unit including a radio frequency receiver for reception of the temperature sensor reading transmitted by the radio frequency transmitter and a second visual display for displaying the received temperature sensor reading.

14. The system as claimed in claim 13, wherein said taste preference includes rare, medium rare, medium and well done.

15. The system as clamed in claim 13, further comprising a noise-generating unit for providing an audible signal disposed within said second unit.

16. The system as claimed in claim 13, wherein said second unit further includes a timer for timing a cooking operation.

17. The system as claimed in claim 13, wherein said control program method further comprises providing an audible signal indicating that the established temperature setting is substantially equal to the monitored temperature sensor reading.

18. A wireless remote cooking thermometer system comprising:
   a first hand-held unit removably positionable at a first location adjacent food being cooked, wherein said first hand-held unit operates using a radio frequency transmitter adapted to transmit temperature readings;
   a temperature sensor connectable to said first hand-held unit, said temperature sensor including a substantially rigid temperature probe insertable into said food being cooked; and a second hand-held unit including data entry keys operable for selecting a meat choice preference of the food being cooked for temperature monitoring and selecting a taste preference associated with said selected meat choice, a visual display and a radio frequency receiver adapted to receive said temperature readings transmitted by said radio frequency transmitter, wherein said second hand-held unit is movable to a second location spaced from said first hand-held unit so as to allow for monitoring of said transmitted temperature readings during a cooking operation, wherein a microprocessor capable of calibration for taste preferences associated with said food being cooked is provided in said second hand-held unit.

* * * * *